US008910657B2

(12) United States Patent
Stoever

(10) Patent No.: US 8,910,657 B2
(45) Date of Patent: Dec. 16, 2014

(54) ELECTRICALLY CONTROLLED PILOT OPERATED PRESSURE REGULATOR VALVE APPARATUS AND METHOD OF OPERATION OF THE SAME

(75) Inventor: Guy T. Stoever, Minooka, IL (US)

(73) Assignee: CNH Industrial America LLC, New Holland, PA (US)

( * ) Notice: Subject to any disclaimer, the term of this patent is extended or adjusted under 35 U.S.C. 154(b) by 1556 days.

(21) Appl. No.: 11/899,524

(22) Filed: Sep. 6, 2007

(65) Prior Publication Data
US 2009/0065719 A1 Mar. 12, 2009

(51) Int. Cl.
G05D 16/20 (2006.01)

(52) U.S. Cl.
USPC ............ 137/505.14; 137/505.18; 137/505.47; 137/492

(58) Field of Classification Search
USPC ............ 137/488, 492, 492.5, 505.14, 505.18, 137/505.47
See application file for complete search history.

(56) References Cited

U.S. PATENT DOCUMENTS

| 3,858,598 | A | | 1/1975 | Carman et al. ................. 137/102 |
|---|---|---|---|---|
| 4,413,648 | A | | 11/1983 | Walters et al. ................. 137/486 |
| 4,585,030 | A | | 4/1986 | Fox ........................... 137/625.64 |
| 4,700,748 | A | * | 10/1987 | Fossati et al. .................. 137/877 |
| 4,741,364 | A | | 5/1988 | Stoss et al. ................ 137/625.64 |
| 4,796,661 | A | | 1/1989 | Hishinuma et al. ......... 137/487.5 |
| 4,856,628 | A | * | 8/1989 | Momiyama ................... 192/3.58 |
| 4,883,091 | A | | 11/1989 | Weiler et al. .............. 137/625.64 |
| 5,062,050 | A | * | 10/1991 | Petzold et al. ................... 701/68 |
| 5,135,070 | A | | 8/1992 | Schwitalla .................... 180/142 |
| 5,836,335 | A | | 11/1998 | Harms et al. |
| 6,022,293 | A | | 2/2000 | Dourra et al. ................. 477/158 |
| 6,116,269 | A | | 9/2000 | Maxson .................... 137/487.5 |
| 6,129,188 | A | * | 10/2000 | Friedmann et al. .......... 192/3.58 |
| 6,308,812 | B1 | * | 10/2001 | Eike et al. .................. 192/85.63 |
| 6,460,510 | B1 | | 10/2002 | Breeden ........................ 123/446 |
| 6,584,999 | B2 | * | 7/2003 | Inayama et al. ............ 137/487.5 |
| 6,637,408 | B2 | | 10/2003 | Djordjevic .................... 123/456 |
| 6,837,477 | B2 | | 1/2005 | Mayr et al. ................ 251/129.08 |
| 2007/0221467 | A1 | * | 9/2007 | Stevenson et al. .......... 192/85 R |

FOREIGN PATENT DOCUMENTS

DE 4030317 3/1992
GB 2192737 1/1988

OTHER PUBLICATIONS

Pride, II, et al. US Pat. Publication No. US 2006/0231147, dated Oct. 19, 2006.

* cited by examiner

Primary Examiner — William McCalister
(74) Attorney, Agent, or Firm — Seyed V. Sharifi T.; Patrick M. Sheldrake

(57) ABSTRACT

The apparatus uses an electrical signal controlled valve, for instance, a proportional solenoid controlled valve, controlled by a controller, to control a pilot operated valve for regulating pressure of fluid in a port thereof in connection with a fluid operated system. A pressure sensor in connection with the port is used to monitor the regulated pressure. The regulated pressurized fluid in the port is also used, as required, as a component of the pilot signal. The valves are configured such that when the electrical control signal is absent or the electrically controlled valve is unresponsive thereto, the presence of pressurized fluid at a predetermined supply pressure, will automatically operate the pilot operated valve in cooperation with a biasing element thereof, for delivering pressurized fluid at a minimum or reduced regulated pressure.

9 Claims, 4 Drawing Sheets

ELECTRICALLY CONTROLLED PILOT OPERATED PRESSURE REGULATOR VALVE APPARATUS AND METHOD OF OPERATION OF THE SAME

TECHNICAL FIELD

The present invention relates to a pressure regulator for a fluid operated system, and, more particularly, to an electrically controlled pilot operated pressure regulator valve apparatus configured and operable for providing pressure regulated fluid delivery to a fluid operated system or systems under a variety of changing operating conditions, which apparatus is also operable for providing pressurized fluid at a reduced regulated pressure when the electronic control is not energized or has failed or malfunctioned, and a method of operation of the apparatus.

BACKGROUND OF THE INVENTION

Pressurized fluid, is commonly utilized for powering a variety of fluid operated systems, particularly on vehicles, such as, but not limited to, work machines such as tractors and the like. Such systems can include, but are not limited to, a transmission, a brake system, and a steering control system. Mechanical regulators, including pressure regulator valves, have long been utilized for regulating the pressure of fluid utilized by such systems. More recently, electrically controlled pressure regulator valves have been used. Advantages of electrically controlled regulators include a precise ability to respond to changing conditions, programmability, reliability, cost and light weight. However, with electrically controlled devices, a disadvantage is that there is the possibility of loss or interruption of electrical power, and/or failure or malfunction of the electrical components or devices. To overcome such an occurrence, it would be advantageous to provide a manner of at least limited operation of the regulator, for delivery of regulated fluid flow at some minimum regulated pressure to the using system or systems, particularly more critical systems, such as the transmission, brakes, and steering.

Accordingly, what is sought is an electrically controlled pilot operated pressure regulator valve apparatus providing at least one of the advantages, and overcoming at least one of the disadvantages, problems, and/or shortcomings, set forth above.

SUMMARY OF THE DISCLOSURE

What is disclosed is an electrically controlled pilot operated pressure regulator valve apparatus, and method of operation thereof, which provides at least one of the advantages, and overcomes at least one of the disadvantages and/or shortcomings, set forth above.

According to a preferred aspect of the invention, an electrical signal controlled valve, which can be, for instance, a proportional solenoid controlled valve, controlled by a controller, is used for automatically controlling a pilot operated valve for regulating pressure of fluid directed to a fluid operated system or systems. A pressure sensor is used for monitoring the regulated pressure, and outputs pressure information to the controller. A portion of the pressurized fluid is directed to a pilot signal port of the pilot operated valve, and is utilized as a component of the pilot signal, in combination with an area differential piston and a biasing element, to act in opposition to a pressurized fluid supply, for regulating the pressure. As a result, the apparatus is capable of regulating the pressure of the delivered fluid, under a variety of changing conditions, such as varying supply fluid pressure and volume, temperature, and demand. Additionally, the valves are configured such that if the electrical control signal is absent or the electrically controlled valve is unresponsive thereto, pressurized supply fluid in opposition to the biasing element, preferably a spring or springs, will regulate the pressurized fluid delivery at a minimum or reduced regulated pressure.

According to another preferred aspect of the invention, the pilot operated valve includes a valve body having a first port adapted to be connected in fluid communication with a source of pressurized fluid, which can be, for instance, but is not limited to, a pump. The pilot operated valve has a second port adapted to be connected in fluid communication with one or more fluid operated systems for receiving pressurized fluid, which can be, for instance, a transmission, brake system, and/or steering system. The valve body has a passage extending between the first port and the second port, and a valve member is disposed and movable through a range of positions for varying a size of the passage, the valve member being configured such that pressurized fluid in the first port will exert a force against the valve member for urging the valve member in a first direction for decreasing the size of the passage. The valve body additionally has a pilot signal port containing the area differential piston and biasing element, which are configured such that pressurized fluid in the pilot signal port will exert a force against the piston for urging the biasing element against the valve member in opposition to the pressure from the fluid in the first port, and which force is operable for moving the valve member in a second direction opposite the first direction, for increasing the size of the passage.

The valve apparatus preferably includes an electrical signal controlled valve, which can be, for instance, a proportional solenoid controlled valve such as a conventional, commercially available pulse width modulated (PWM) solenoid controlled valve controllable by application of a variable current thereto. The electrical signal controlled valve is connected in fluid communication with the pilot signal port of the pilot signal operated valve, with the second port of the pilot operated valve, and with a low pressure fluid path, which can be, for instance, a fluid tank or reservoir. The electrical signal controlled valve is controllable by electrical control signals for variably connecting the pilot signal port with the second port for receiving pressurized fluid, and with the low pressure fluid path, respectively. The apparatus includes a pressure sensor configured and operable for sensing pressure of a pressurized fluid in or in connection with the second port of the pilot operated valve, and outputting a signal representative thereof.

The apparatus includes a controller connected to the pressure sensor for receiving the signals therefrom, and to the electrically controlled valve for outputting electrical control signals thereto, the controller being automatically operable responsive to signals received from the pressure sensor for outputting control signals to the electrically controlled valve for controlling the fluid communication of the second port and the low pressure fluid path with the pilot signal port of the pilot operated valve for controllably moving and positioning the valve member thereof as required for maintaining the pressurized fluid in the second port at a predetermined regulated pressure. Additionally, the pilot operated valve and the electrically controlled valve are configured such that when the electrical control signal is absent or the electrically controlled valve is unresponsive thereto, for instance, due to malfunction or the like, pressurized fluid present in the first port at a predetermined supply pressure, will cause opposing forces to be exerted against the valve member of the pilot operated valve by the pressurized fluid in the first port and by the biasing element in the pilot signal port, for maintaining pressurized fluid in the second port at a predetermined minimum regulated pressure. For instance, for a supply pressure of about 3000 pounds per square inch (psi), the valves maintain the minimum regulated pressure at about 200 psi, which value can be selected to provide at least a minimally pressurized fluid supply to the receiving system or systems such as the transmission, brakes and/or steering systems of a work machine.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
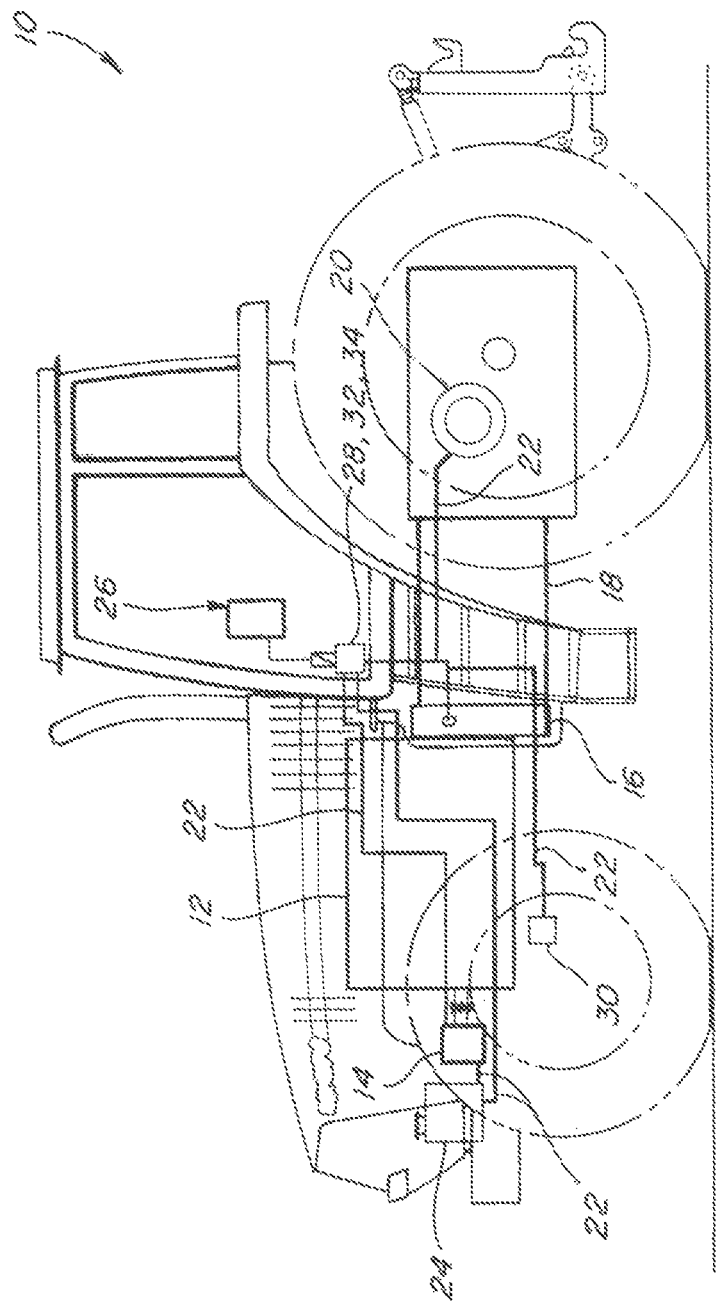
FIG. 1 is a side elevational view of a work machine including an electrically controlled pilot operated pressure regulator valve apparatus of the invention, in connection with a fluid system of the work machine.

Referring now to the drawings, in FIG. 1, a work machine 10 of well known construction and operation, is shown. Work machine 10 is a conventional tractor typically utilized for construction and/or agricultural uses, and is intended to be representative of a wide variety of fluid system applications with which the present invention can be used, and thus is not intended to be limiting. Work machine 10 includes an engine 12 controllably operable in the well known manner for driving a fluid pump 14 which serves as a pressurized fluid source for a variety of fluid operated systems of work machine 10, which can include, but are not limited to, a clutch 16, a transmission 18, and a brake system 20, all of which are also conventionally constructed and operable.

Pump 14 is operable to draw fluid through a fluid line 22 from a fluid reservoir or tank 24, and pressurizes the fluid to a supply pressure, which is typically about 3000 psi, for use as required by the various fluid operated systems of machine 10, such as transmission 18 and brake system 20 mentioned above. The flow level of fluid required by the respective fluid systems, duration of the requirement, and operating pressure, will typically vary over time, such that it is desirable to provide a pressure regulator between pump 14 and the using fluid system or systems, to meet performance requirements and provide satisfactory operation.

Figure 2:
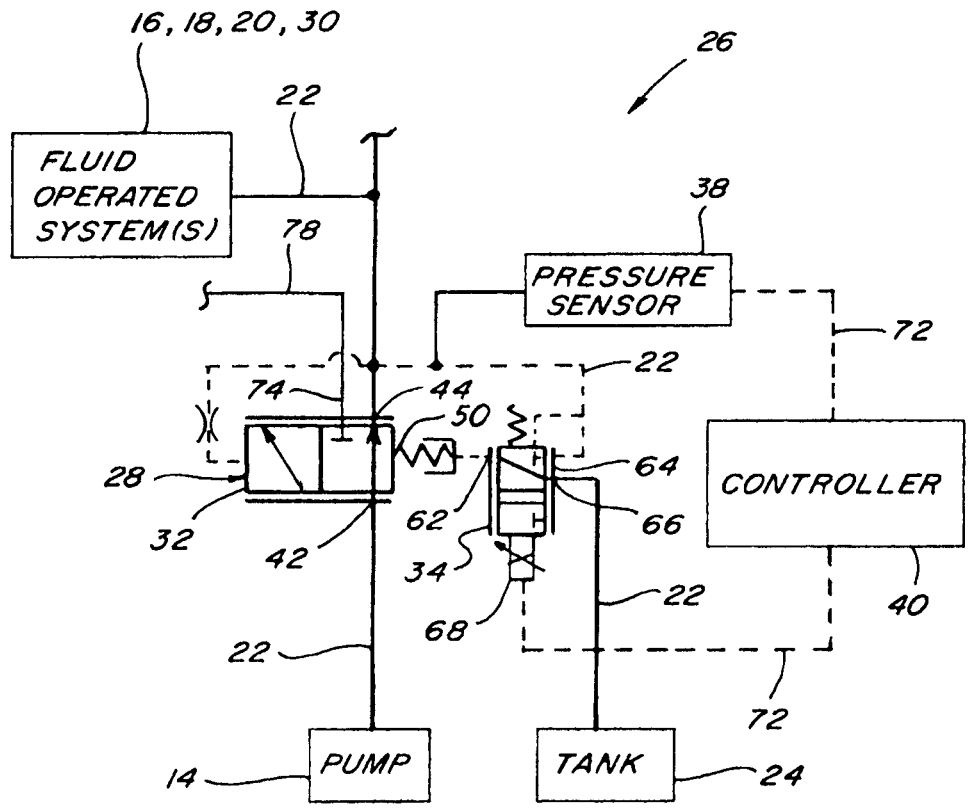
FIG. 2 is a simplified schematic representation of the electrically controlled pilot operated pressure regulator valve apparatus of the invention.
Figure 3:
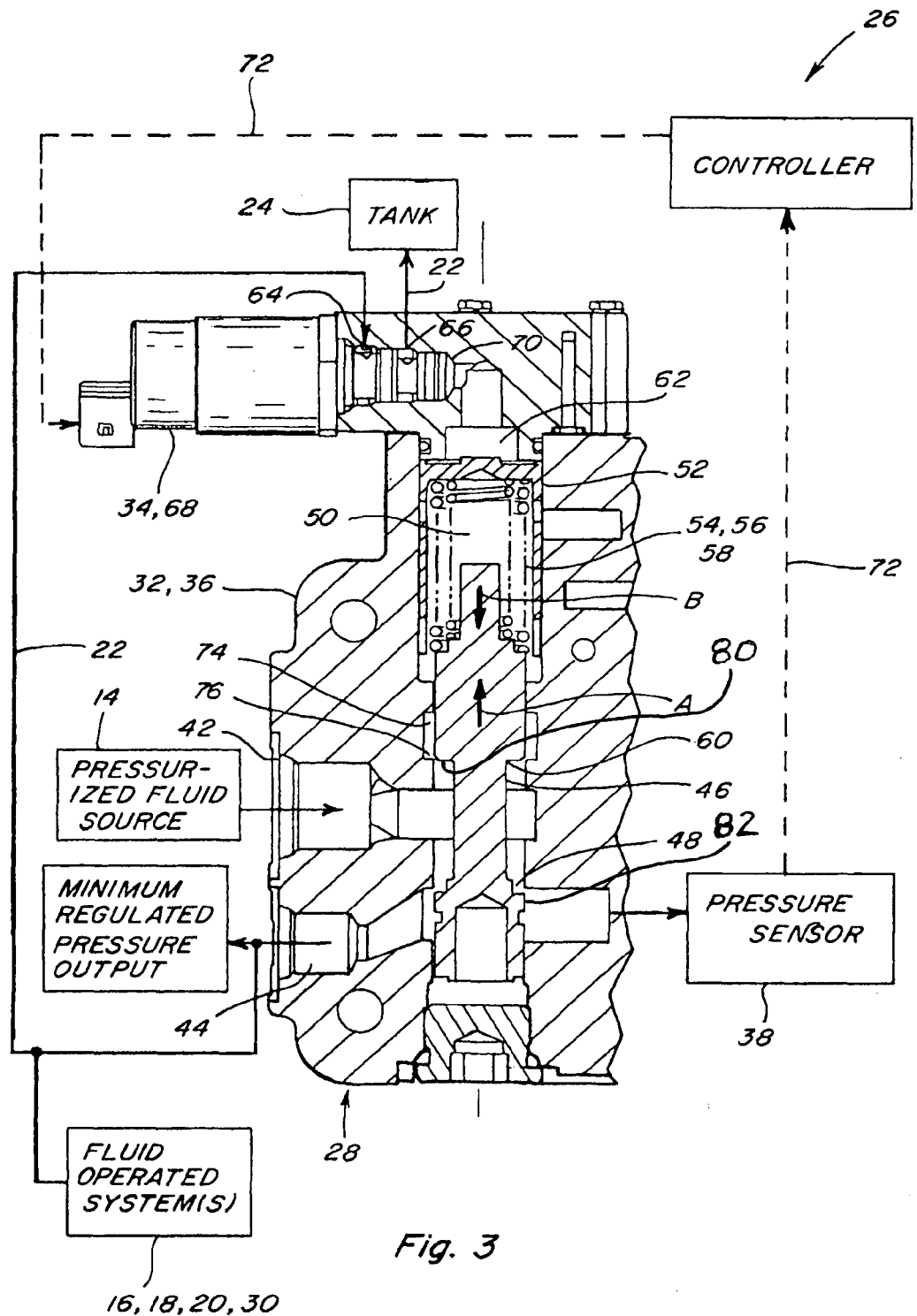
FIG. 3 is a diagrammatic representation of the electronically controlled pilot operated pressure regulator valve apparatus of the invention in a first representative operating state, wherein pressurized fluid in a second port of a pilot operated valve of the apparatus is regulated at a minimum pressure.
Figure 4:
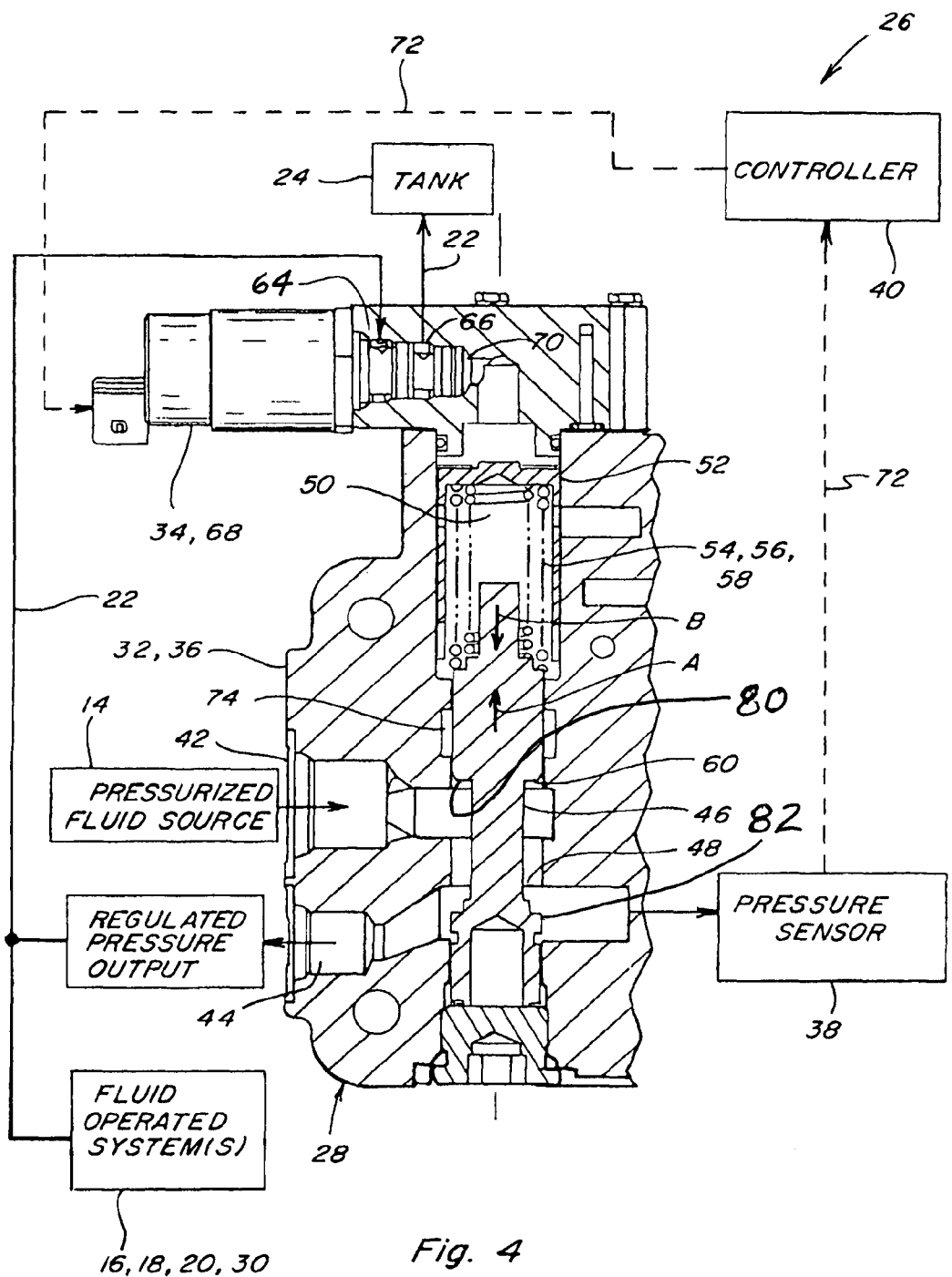
FIG. 4 is another diagrammatic representation of the electrically controlled pilot operated pressure regulator valve of the invention, in a second representative operating state, which is a higher pressure operating state.

Referring also to FIGS. 2, and 3 and 4, an electrically controlled, pilot operated pressure regulator valve apparatus 26 constructed and operable according to the teachings of the present invention, adapted for use with for supplying pressurized fluid to the fluid operated systems of work machine 10, is shown. Apparatus 26 is configured so as to be automatically operable for regulating the pressure of the pressurized fluid delivered to each of the fluid operated systems, such that the fluid pressure is substantially uniform even when subject to a variety of changing conditions, which can include, but are not limited to, variations in pressurized fluid supply pressure, pressurized fluid demand, and temperature. Additionally, in the event of lack of electrical power, an interruption in the delivery of electrical power to apparatus 26, and/or failure or malfunction of one or more of the electrical components of apparatus 26, if pressurized fluid at about the supply pressure is present, apparatus 26 is configured to automatically operate to provide at least some pressurized fluid at a reduced or minimum regulated pressure to the using fluid systems, such that they will be at least nominally functional.

To achieve the above capabilities, apparatus 26 preferably includes a regulator valve arrangement 28 connected by additional fluid lines 22, to the fluid operated systems of work machine 10, including clutch 16, transmission 18, brake system 20, and also a steering system 30. Valve arrangement 28 includes a three port pilot operated valve 32 movable through an infinite number of positions between two extreme positions, and an electrical signal controlled valve 34, which is preferably a three port proportional solenoid controlled valve of conventional, well known construction, mounted to a valve body 36 of pilot operated valve 32. Apparatus 26 additionally includes a Pilot operated valve 32 has a first port 42 connected to a pressurized fluid source including pump 14, for receiving pressurized fluid therefrom, and a second port 44 connected to at least one of the fluid operated systems (e.g., clutch 16, transmission 18, brake system 20, steering system 30) of work machine 10 for delivering the pressurized fluid thereto, at a desired regulated pressure, as will be explained. Valve body 36 includes an elongate spool valve member 46, including a valve member portion 82, movable therewithin for varying the size of a passage 48 defined between an edge of the valve member and an annulus of port 44, which passage, when open, will connect port 44 with port 42. Valve member 46, including a valve member portion 80, and body 36 are configured such that pressurized fluid in an annulus of first port 42 around valve member 46 will exert a force against a shoulder 60 thereof, for urging the valve member in a first direction (arrow A) for enlarging the size of passage 48.

Valve body 36 has a pilot signal port 50 containing an area differential piston 52 and a biasing element 54, disposed to be biased against valve member 46 by pressurized fluid in pilot signal port 50 in a second direction (arrow B) in opposition to the force exerted against valve member 46 in direction A by the pressurized fluid in first port 42. Here, biasing element 54 is depicted as comprising two concentric compression springs 56 and 58, which have been selected as a result of their compact size, and the combined force that they can exert when compressed. However, it should be noted that, alternatively, other springs and/or other biasing elements can be utilized as required for providing the necessary force for a particular application.

Electrical signal controlled valve 34 is utilized in connection with pilot signal port 50, for providing a fluid pilot signal thereto operable for controlling pressure conditions therein for controllably moving and positioning valve member 46, and thus, the size of passage 48, as required, for achieving and maintaining a predetermined regulated fluid pressure in second port 44 of valve 32. Valve 34 has a port 62 in direct fluid connection with pilot signal port 50 of valve 32, a port 64 in fluid communication with second port 44 of valve 32 via a pilot signal fluid line 22, and a port 66 in fluid communication with a low pressure fluid path, preferably tank 24, via another fluid line 22.

Valve 34 is preferably controllably operable by a pulse width modulated signal, which is preferably a variable electrical current, for moving and positioning a valve member 70 in a range of positions for connecting port 62 variably with ports 64 and 66. Generally, movements of valve member 70 in one direction will increase fluid communication between port 62 and port 64 and thus port 44 of valve 32, while decreasing fluid communication between port 62 and port 66, and movements in the opposite direction will decrease fluid communication between ports 62 and 64, and increase fluid communication between ports 62 and 66. Valve member 70 is configured such that pressurized fluid in port 64 will urge that valve member in the direction for increasing the connection of ports 62 and 66. Also generally, increasing fluid communication between ports 62 and 64 will increase fluid pressure in pilot signal port 50 of valve 32, whereas decreasing fluid communication between ports 62 and 64 will decrease fluid pressure therein. Increasing the pressure in pilot signal port 50 will function to increase the force acting against valve member 46 in direction B, whereas decreasing the pressure will function to decrease the force acting against the valve member in that direction.

Pressure sensor 38 preferably comprises a conventionally operable, commercially available high pressure transducer, and is disposed in fluid connection with second port 44 of valve 32. Sensor 38 is operable for sensing a pressure of pressurized fluid in or in connection with port 44, and outputting a signal representative of the sensed pressure, over a conductive path 72, to controller 40. Conductive path 72 can comprise a conventional wire or wires of a wiring harness of machine 10, or a wireless communications path, as desired.

Controller 40 is preferably a conventional commercially available programmable electronic controller, and is connected to an input of solenoid 68 via another conductive path 72, for outputting the electrical control signals (variable currents) thereto. Controller 40 is programmed to be automatically operable responsive to signals from pressure sensor 38, for outputting control signals to electrical signal controlled valve 38, for maintaining pressurized fluid in pilot signal port 50 to cause area differential piston 52 and biasing element 54 to exert a force against valve member 46 (in direction B) in opposition to the force exerted thereagainst (in direction A) by the pressurized fluid in first port 42, for positioning valve member 46 for maintaining pressurized fluid in second port 44 at a predetermined regulated pressure.

Referring more particularly to FIGS. 3 and 4, in operation, the introduction of pressurized fluid at a high pressure, such as the supply pressure, into first port 42 of pilot operated valve 32, will exert a force against annular shoulder 60 of valve member 46, to thereby urge valve member 46 in direction A (less force will be exerted by the pressurized fluid to urge valve member 46 in the opposite direction, as a result of the presence of passage 48, which will allow the fluid to flow to second port 44). Movement of valve member 46 will be opposed by springs 56 and 58, which will be subjected to a compression loading condition by the force. If the force is sufficient to compress the springs, valve member 46 will move in direction A, and if a high pressure is present, for instance, a 3000 psi supply pressure, the displacement of valve member 46 may be sufficient such that a third port 74 of valve 32 is connected with first port 42 via a second passage 76, as illustrated in FIG. 3. Here, it can be observed that the size of second passage 76 will be enlarged by movement of valve member 46 in direction A, and the same time, the size of passage 48 will be decreased. And, the size of second passage 76 will be decreased by movement of valve member 46 in direction B, and the size of passage 48 will be increased. Thus, the sizes of passages 48 and 76 are inversely affected by the movement of valve member 46.

Valve member 46 is positionable at about the position shown in FIG. 3, by the presence of pressurized fluid at about the supply pressure of 3000 psi in first port 42, but no pressurized fluid connection between second port 44 and pilot signal port 50, which would be the circumstances with solenoid 68 of valve 34 de-energized. Valve member 46 and the annuluses of ports 44 and 74 are configured and positioned such that, under these conditions, fluid pressure in second port 44 will be about 200 psi, which is a predetermined minimum regulated pressure required for enabling at least some operation of fluid operated systems 16, 18, 20 and 30. This is representative of operation of apparatus 26 with solenoid 68 of valve 34 de-energized, which can occur intentionally, and unintentionally, for instance, as a result of conditions such as a failure or malfunction of solenoid 68 of valve 34, or interruption or absence of the electrical control signal thereto, such that valve 34 remains in the right hand position illustrated in FIG. 2.

Referring more particularly to FIG. 4, valve member 46 is shown positioned at a representative normal operating position for regulating pressure of fluid in port 44 at a predetermined regulated pressure, of for instance 1800 psi. In this operating mode, the compressive forces exerted by valve member 46 against springs 56 and 58 of biasing element 54 in direction A as a result of pressure in first port 42, will be opposed by forces exerted thereagainst in direction B, by pressure in pilot signal port 50, acting against area differential piston 52. Area differential piston 52 has a surface area which is a predetermined amount greater than the surface area of shoulder 60 of valve member 46, such that a lower pressure condition in pilot signal port 50 can exert a greater force against biasing element 54 and valve member 46 in direction B, compared to a force exerted thereagainst in direction A by a greater pressure condition in port 42. As a result, the lower pressure condition in pilot signal port 50 is operable to cause displacement of valve member 46 in direction B, for reducing the size of passage 48. This enables using the fluid of port 44 at the regulated pressure less than the supply pressure of the fluid in port 42, as a pilot signal fluid. Controller 40 monitors the pressure in port 44 via sensor 38, and outputs control signals to solenoid 68 for controlling the fluid communication between pilot signal port 50 (port 62 of valve 34), port 44 (port 64) and tank (port 66), as required for regulating or maintaining the pressure in port 44 at the predetermined level.

As set forth above, displacement of valve member 46 in direction A will decrease the size of passage 48, whereas displacement in direction B will increase the size of the passage. As examples of general operating rules for controller 40, an increase in demand for fluid in port 44 will lower pressure in that port, which will be sensed by sensor 38, such that controller 40 will responsively control solenoid 68 to increase the fluid signal pressure in port 50, to cause a movement of valve member 46 in direction B, to thereby increase the size of passage 48, such that more pressurized fluid at the higher pressure will enter, and pressure in port 44 will increase. Conversely, a sensed increase in pressure in port 44 will be responded to by controller 40 by decreasing fluid communication between port 44 and port 50, to resultantly cause a movement of valve member 46 in direction A, to thereby decrease the size of passage 48. In the event of a reduction in pressure of the fluid supply, forces acting against valve member 46 in direction A may be reduced, such that valve member 46 may be urged to move in direction B, to thereby increase the size of passage 48, to increase the pressure in port 44. This will be detected by pressure sensor 38, and controller 40 may responsively decrease the pilot signal pressure to maintain the regulated pressure in port 44. As another example, warmer fluid will typically flow more easily, whereas cooler fluid will be more sluggish and resistant to flow, and controller 40 can be programmed to maintain the pressure of fluid in port 44 at the regulated pressure through a range of temperature variations.

Thus, an advantage of apparatus 26 of the invention, is the ability to regulate pressure of fluid delivered to operating systems under a variety of changing conditions, including changes in supply, demand and temperature. As another advantage, even when the control signal to the electrical signal control valve is absent, fluid flow at a minimum regulated pressure is provided to the operating systems connected to the apparatus.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

What is claimed is:

1. A pressure regulator apparatus, comprising:
   a pilot operated valve including a valve body having a first port adapted to be connected in fluid communication with a source of pressurized fluid, and a second port adapted to be connected in fluid communication with at least one system for receiving pressurized fluid, the valve body having a passage extending between the first port and the second, and a valve member disposed within the valve body and movable through a range of positions varying a size of the passage between an exterior surface of the valve member and an interior surface of the valve body, the valve member having a first valve member portion in close proximity to and operatively associated with the first port and a second valve member portion in close proximity to and operatively associated with the second port, the first valve member portion being different from the second valve member portion, the valve member being configured such that pressurized fluid from the second port will exert a force directly against an exterior surface of the valve member for urging the valve member in a first direction decreasing the size of the passage with respect to a direction perpendicular to the first direction, and
   the valve body having a pilot signal port containing an area differential piston and a biasing element that is moveable in the first direction and a second direction, the second direction is opposite the first direction and enlarges the passage;
   an electrical signal controlled valve connected in fluid communication with the pilot signal port, with the second port of the pilot operated valve, and with a low pressure fluid path, the electrical signal controlled valve being controllable by electrical control signals for variably connecting the pilot signal port in fluid communication with the second port and the low pressure fluid path, respectively; wherein unavailability of the output electrical signal causes force exertion against a shoulder of the valve member for a movement thereof, to maintain a predetermined minimum pressure required for operation of a machine that hosts the pressure regulator apparatus exertion of the predetermine minimum pressure facilitated via opening of a second passage between the first port and a third port that is associated with the pilot operated valve;
   a pressure sensor configured and operable for sensing a pressure of a pressurized fluid in or in connection with the second port of the pilot operated valve and outputting a signal representative thereof; and
   a controller connected to the pressure sensor and configured to receive the signals therefrom, and to the electrical signal controlled valve and configured to output electrical control signals thereto, the controller automatically operably responsive to signals received from the pressure sensor to output control signals to the electrically controlled valve controlling the fluid communication of the second port and the low pressure fluid path with the pilot signal port of the pilot operated valve controllably positioning the valve member as required for maintaining the pressurized fluid in the second port at a predetermined regulated pressure.

2. The apparatus of claim 1, wherein fluidly connecting the second port to the pilot port through the electrical signal controlled valve exerts a force on the valve member moving the valve member in the second direction enlarging the size of the passage.

3. The apparatus of claim 1, wherein the electrical signal controlled valve is a pulse width modulated proportional solenoid controlled valve, and the electrical control signal comprises a variable electrical current, the electrical signal controlled valve configured for controlled movement to multiple open positions for varying the force exerted against the piston in response to a corresponding current.

4. The apparatus of claim 1, wherein the pilot operated valve and the electrically controlled valve are configured such that when the electrical control signal is absent or the electrical signal controlled valve is unresponsive thereto, pressurized fluid present in the first port at a predetermined supply pressure, and the biasing element, will exert opposing forces against the valve member for automatically positioning the valve member in a first position corresponding to a minimum passage opening between the first and second ports allowing a flow therethough for maintaining pressurized fluid in the second port at a predetermined minimum regulated pressure less than the predetermined supply pressure.

5. The apparatus of claim 4, wherein the valve body of the pilot operated valve further includes the a third port connected to the first port by the a second passage which is variable in size by the movement of the valve member through the range of positions, the third port being positioned such that the size of the second passage will vary generally inversely in relation to variations in the size of the passage connecting the first port with the second port, and such that the third port will be connected in fluid communication with the first port when the valve member is in the position for maintaining the fluid pressure in the second port at the predetermined minimum regulated pressure.

6. The apparatus of claim 5, wherein the first port of the pilot operated valve is connected to a source of pressurized fluid operable for delivering pressurized fluid thereto at the predetermined supply pressure, the second port is connected and in fluid communication to at least one system for delivering pressurized fluid thereto, and the third port is connected to a fluid path having a pressure lower than the supply pressure.

7. The apparatus of claim 4, wherein the predetermined supply pressure is about 3000 psi, and the predetermined minimum pressure is about 200 psi.

8. The apparatus of claim 6, wherein the source of pressurized fluid comprises a fluid pump of a work machine, and the at least one system comprises a fluid operated system of the work machine.

9. The apparatus of claim 1, wherein the biasing element comprises a spring.

* * * * *